United States Patent
Stumber et al.

(10) Patent No.: US 7,889,231 B2
(45) Date of Patent: Feb. 15, 2011

(54) IMAGE RECORDING SYSTEM WITH IMPROVED CLOCK SIGNAL TRANSMISSION

(75) Inventors: Tobias Stumber, Stuttgart (DE); Steffen Fritz, Wurmberg (DE)

(73) Assignee: Robert Bosch GmbH, Stuttgart (DE)

( * ) Notice: Subject to any disclaimer, the term of this patent is extended or adjusted under 35 U.S.C. 154(b) by 715 days.

(21) Appl. No.: 11/659,634

(22) PCT Filed: Jun. 14, 2005

(86) PCT No.: PCT/EP2005/052729
§ 371 (c)(1), (2), (4) Date: Oct. 2, 2007

(87) PCT Pub. No.: WO2006/015895
PCT Pub. Date: Feb. 16, 2006

(65) Prior Publication Data
US 2008/0170135 A1    Jul. 17, 2008

(30) Foreign Application Priority Data
Aug. 7, 2004   (DE) ............... 10 2004 038 495

(51) Int. Cl.
*H04N 7/18* (2006.01)

(52) U.S. Cl. .................. 348/148; 348/143
(58) Field of Classification Search ........... 348/148, 348/207.1, 211.99, 211.2, 211.11
See application file for complete search history.

(56) References Cited

U.S. PATENT DOCUMENTS

| | | | | |
|---|---|---|---|---|
| 5,801,770 A * | 9/1998 | Paff et al. | ...... | 348/211.5 |
| 6,104,428 A * | 8/2000 | Lu et al. | ...... | 348/159 |
| 2003/0146976 A1 * | 8/2003 | Liu | ...... | 348/207.1 |
| 2004/0032493 A1 * | 2/2004 | Franke et al. | ...... | 348/148 |
| 2004/0183908 A1 * | 9/2004 | Tominaga et al. | ...... | 348/159 |
| 2004/0223062 A1 * | 11/2004 | Pettegrew et al. | ...... | 348/211.4 |

FOREIGN PATENT DOCUMENTS

| EP | 0 515 064 | 11/1992 |
|---|---|---|
| EP | 1 284 578 | 2/2003 |

* cited by examiner

*Primary Examiner*—Kelly L Jerabek
(74) *Attorney, Agent, or Firm*—Kenyon & Kenyon LLP

(57) ABSTRACT

An image-recording system having at least one camera, having a receiving device and having a signal connection between the camera and the receiving device. The receiving device generates a PWM-coded signal which is transmitted to the camera. A clock signal is obtained in the camera from the PWM-coded signal.

13 Claims, 1 Drawing Sheet

IMAGE RECORDING SYSTEM WITH IMPROVED CLOCK SIGNAL TRANSMISSION

BACKGROUND INFORMATION

The image-recording system is preferably to be used in motor vehicles. Image-recording systems for this type of application have to be designed to be particularly robust and cost-effective. In one image-recording system that includes a camera having a digital interface, the image data gathered by the camera are usually passed on, via a rapid serial connection, to the receiving device ("downlink") if the latter is spatially at a distance from the camera. A control unit that further processes these image data, or is controlled by the image data, comes into consideration as the receiving device. For communication between the receiving device and the camera, transmission of data in the direction of the camera ("uplink") is also necessary. In comparison to the data transmission between the camera and the receiving device, in this context, the required bandwidth is very low, since essentially only control signals and no image data have to be transmitted. In order to implement such bidirectional data connections, at the present time, unidirectional LVDS connections (LVDS=low voltage differential signaling) having different bandwidths or so-called high-speed bus systems (such as FireWire, IEEE1394, USB 2.0) are in use. The disadvantage in the bus systems mentioned is that they do not receive any direct clock pulse information. As soon as clock pulse information is required, the clock pulse has to be generated via a timing recovery. This, however, requires additional circuit elements, which contribute to making the image-recording system more costly.

SUMMARY OF THE INVENTION

The present invention makes possible an inexpensive bidirectional communication between a camera and a receiving device of an image-recording system, since only comparatively little hardware and software resources are required. In this context, it is important to weigh carefully between logical resources (big in bus systems) and hardware resources such as cable conductors and plug pins (big in two unidirectional LVDS connections). The present invention not only makes possible the control of the camera, in this instance, but an accurate synchronization of the data connection between the camera and the receiving device, which, for instance, is of great importance in an image-recording system using a stereo camera. As few as possible additional components are required for this in the camera itself, since it has to be manufactured as inexpensively as possible.

The present invention relates to the recognition that only a single pair of conductors is required for controlling the camera of the image-recording system ("uplink"). On this pair of conductors, a differential LVDS signal is coded via a pulse width modulation (PWM) in such a way that data signals and clock signals are able to be transmitted simultaneously. For the data connection between the camera and the receiving device in the direction "downlink", on the other hand, several pairs of conductors having a separate clock signal can be used, in order to take into account the required high bandwidth. One advantage of the pulse width modulation used is that all rising sides of the signal remain equidistant, and therefore a clock pulse generation in the camera is made possible, using a PLL (phase-lock-loop) or a DLL (digital-lock-loop) circuit. One may thereby omit a quartz generator for generating the clock pulse that would otherwise be required. Furthermore, by this method, synchronous operation of the camera and the receiving device are achievable in a simple manner, since the clock signal is directly derived from the uplink signal generated in the receiving device. Also advantageously, a stereo camera having an oscillator is able to be synchronized with the aid of the clock signal derived from the uplink signal. Thus, for example, the clock signal may be used for triggering the reading out of individual lines of the images taken by the stereo camera.

DETAILED DESCRIPTION

Figure 1:
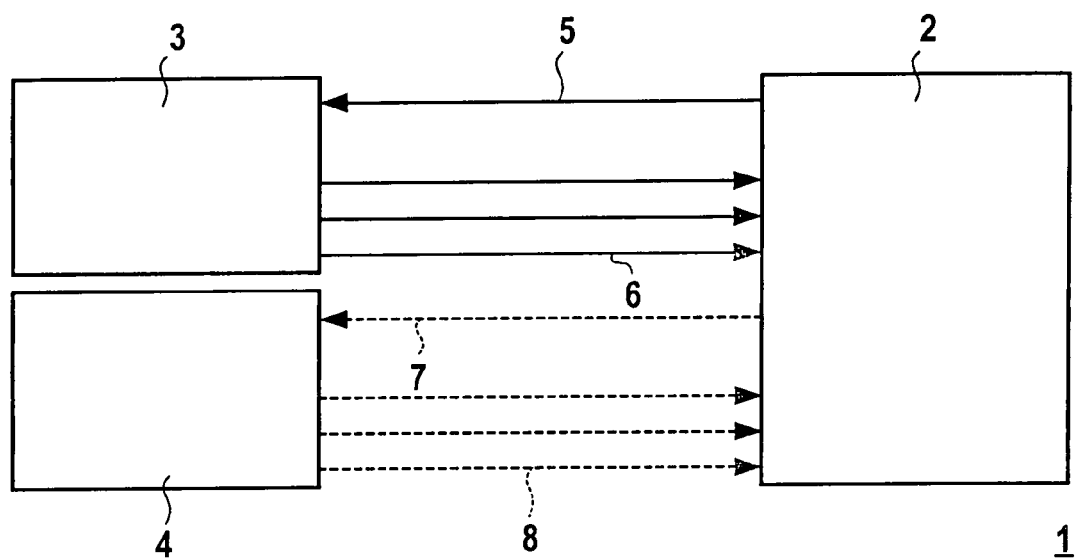
FIG. 1 shows a block diagram of an image-recording system.
Figure 2:
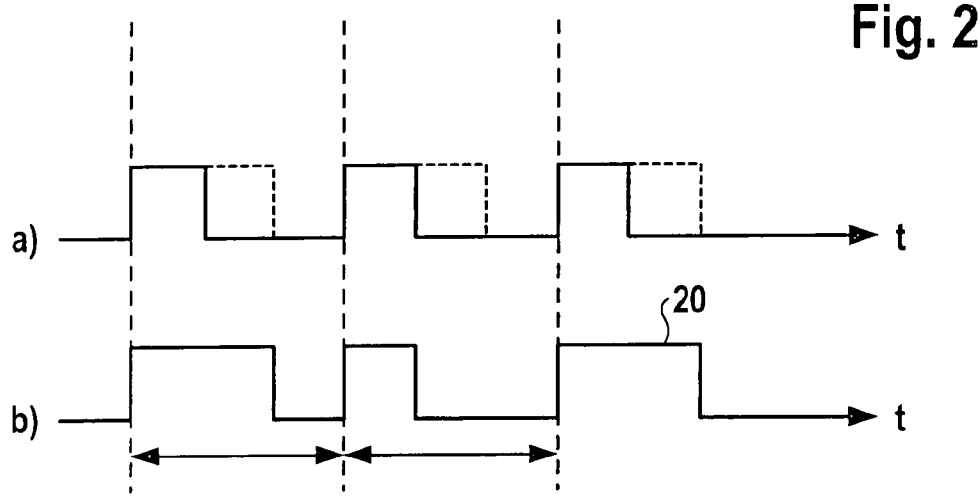
FIG. 2 shows the signal patterns of a PWM-coded signal.

FIG. 1 shows the block diagram of an image-recording system 1. Image-recording system 1 includes at least one camera 3 and one receiving device 2. The at least one camera 3 and the receiving device 2 are connected to each other via signal connections 5, 6. In this context, signal connection 5 is a so-called "uplink" connection, that is, it makes possible a signal transmission from receiving device 2 to camera 3. In this context, signal connection 6 is a so-called "downlink" connection, that is, it makes possible a signal transmission from camera 3 to receiving device 2. The method of functioning of the image-recording system will now be described below. Receiving device 2 steadily transmits a sequence of PWM-coded (PWM=pulse-width-modulated) digital signals via signal connection 5, which, according to the illustration in FIG. 2a are made up of logical zeros or logical ones. In the illustration in FIG. 2a, a continuous line represents a logical zero, while the dotted line means a logical one. An example for the transmitted signal sequence is shown in FIG. 2b. The curve shown there, which represents a PWM-coded signal as a function of time t, represents the signal sequence 1, 0, 1. As was mentioned at the outset, the PWM signal is distinguished by the fact that all rising sides of the signal are equidistant. This is also indicated by the arrows of equal length that are shown in FIG. 2b. From the PWM signal (FIG. 2b) that is transmitted via signal connection 5 from receiving device 2 to camera 3, one is consequently able, by using PLL circuits or DLL circuits known per se, to recover a clock signal in camera 3, which runs synchronously to the signal transmitted via signal connection 5 to camera 3. Using this recovered clock signal, the PWM signal (FIG. 2b) transmitted by receiving device 2 to camera 3 is scanned. By using this scan, the information transmitted from receiving device 2 to camera 3 is thus decoded, which was coded before, into the PWM signal. In comparison to the alternatives mentioned at the outset, which require a larger number of signal connections between receiving device 2 and camera 3, or require their own clock pulse oscillator in camera 3, the design approach according to the present invention is distinguished by a low expenditure for components, and is therefore able to be manufactured comparatively economically.

In one advantageous further embodiment of the present invention, image-recording system 1 includes a stereo camera (camera 3 and camera 4 in FIG. 1). The additional camera 4 is connected to receiving device 2 by signal connections 7, 8, that are drawn in using dotted lines. Signal connection 7, in turn, is an "uplink" connection, on which a PWM-coded signal is also transmitted. Signal connection 8 ("downlink") corresponds to signal connection 6 and is used for transmitting data from camera 4 to receiving device 2. This embodiment variant especially offers the advantage that the two cameras 3, 4 do not require their own clock pulse oscillator, and yet they still run synchronously. If there were to be greater circuit expenditure, there are additional embodiment variants in which the possibility is available to provide stereo cameras 3, 4 with their own clock pulse oscillator, and only to make possible the synchronization via a clock signal recovered from the PWM-coded signal.

What is claimed is:

1. An image-recording system comprising:
   at least one camera without an internal clock pulse oscillator;
   a receiving device; and
   at least one signal connection situated between the at least one camera and the receiving device,
   wherein the receiving device includes an arrangement for generating a PWM-coded signal,
   wherein the at least one signal connection is for transmitting the PWM-coded signal from the receiving device to the camera, and
   wherein the camera includes an arrangement for decoding the PWM-coded signal and for recovering a clock signal from the PWM-coded signal.

2. The image-recording system according to claim 1, wherein the at least one camera includes a stereo camera having two cameras, each of the cameras being connected to the receiving device via a signal connection for transmitting a PWM-coded signal, and each of the cameras including an arrangement for decoding the PWM-coded signal and for recovering a clock signal from the PWM-coded signal.

3. The image-recording system according to claim 2, wherein operation of the two cameras is synchronized using the recovered clock signal.

4. The image-recording system according to claim 1, wherein the at least one camera includes two cameras and an oscillator, and further comprising an arrangement for synchronizing the cameras, which recover the clock signal from a PWM-coded signal generated by the receiving device.

5. The image-recording system according to claim 1, wherein each of the at least one camera is connected to the receiving device using a broadband signal connection.

6. The image-recording system according to claim 1, wherein the system is used in a motor vehicle.

7. The image-recording system according to claim 1, wherein the arrangement for decoding includes one of a phase-lock-loop circuit and a digital-lock-loop circuit.

8. The image-recording system according to claim 1, wherein the recovered clock signal is used for synchronizing operation of the at least one camera with the receiving device.

9. The image-recording system according to claim 1, wherein the PWM-coded signal is decoded using the recovered clock signal.

10. The image-recording system according to claim 1, wherein the receiving device is arranged for receiving images from the at least one camera.

11. A method for controlling an image-recording system that includes a receiving device and at least one camera without an internal clock pulse oscillator, comprising:
    using the receiving device to generate a PWM-coded signal;
    feeding the signal to the camera via a signal connection; and
    regenerating a clock signal in the camera from the PWM-coded signal.

12. The method according to claim 11, wherein the clock signal regenerated from the PWM-coded signal is used for controlling the camera and for controlling a data transmission between the camera and the receiving device.

13. The method according to claim 11, further comprising:
    generating a further clock signal in the at least one camera; and
    using the regenerated clock signal from the PWM-coded signal for synchronization purposes.

* * * * *